(12) United States Patent
Windle

(10) Patent No.: US 11,608,036 B2
(45) Date of Patent: Mar. 21, 2023

(54) METHOD AND APPARATUS FOR STABILIZING VEHICULAR JACK BASES

(71) Applicant: Bill Windle, Syracuse, IN (US)

(72) Inventor: Bill Windle, Syracuse, IN (US)

(*) Notice: Subject to any disclaimer, the term of this patent is extended or adjusted under 35 U.S.C. 154(b) by 718 days.

(21) Appl. No.: 16/571,653

(22) Filed: Sep. 16, 2019

(65) Prior Publication Data

US 2021/0078240 A1    Mar. 18, 2021

(51) Int. Cl.
*B60S 9/02* (2006.01)
*B29C 59/02* (2006.01)
*F16M 13/06* (2006.01)
*B62D 63/08* (2006.01)

(52) U.S. Cl.
CPC .............. *B60S 9/02* (2013.01); *B29C 59/02* (2013.01); *B62D 63/08* (2013.01); *F16M 13/06* (2013.01); *F16M 2200/08* (2013.01)

(58) Field of Classification Search
CPC ........ F16M 11/36; F16M 2200/08; B60S 9/02
See application file for complete search history.

(56) References Cited

U.S. PATENT DOCUMENTS

| 5,980,351 | A | * | 11/1999 | McCook | A43B 3/0026 36/15 |
| 8,336,868 | B2 | * | 12/2012 | Wirth, Jr. | B23Q 1/032 269/296 |
| D693,862 | S | * | 11/2013 | Wirth, Jr. | B23Q 1/032 D15/140 |
| D694,299 | S | * | 11/2013 | Wirth, Jr. | A43B 13/22 D15/140 |
| 9,687,043 | B2 | * | 6/2017 | Kenney | A43B 13/22 |
| 10,322,704 | B2 | * | 6/2019 | Nobles | E02F 9/085 |
| D912,103 | S | * | 3/2021 | Windle | A43B 13/30 D15/28 |
| 10,960,856 | B1 | | 3/2021 | Weddle | |
| D924,123 | S | * | 7/2021 | Sweigart | A43C 15/00 D12/503 |
| D927,383 | S | * | 8/2021 | Windle | F21K 2/00 D34/31 |
| 11,208,083 | B2 | * | 12/2021 | Windle | F21K 2/00 |
| 2002/0083623 | A1 | * | 7/2002 | Joseph | A43C 15/00 36/122 |
| 2005/0120589 | A1 | * | 6/2005 | Coomes | A43B 13/30 36/15 |
| 2012/0068396 | A1 | * | 3/2012 | Wirth, Jr. | B23Q 1/032 269/289 R |
| 2014/0096416 | A1 | * | 4/2014 | Steigerwald | A43C 15/066 36/122 |
| 2016/0130120 | A1 | * | 5/2016 | Koberg | B66C 23/78 248/678 |
| 2016/0244030 | A1 | * | 8/2016 | Lehman | B60S 9/08 |

(Continued)

*Primary Examiner* — Eret C Mcnichols
(74) *Attorney, Agent, or Firm* — C. John Brannon; Brannon Sowers & Cracraft PC

(57) ABSTRACT

A reusable vehicular jack pad system, including a plurality of jack pads, each respective pad further including a top face, an oppositely disposed bottom face, a jack-engaging assembly operationally connected to the top face, a palm portion, and a toe portion extending from the palm portion. Each respective jack pad is shaped like an animal paw. Each respective bottom face is contoured to leave a paw print in soft ground. Each respective top face is contoured to stackingly engage a respective bottom face.

1 Claim, 7 Drawing Sheets

Fig. 2

(56) References Cited

U.S. PATENT DOCUMENTS

2019/0366984 A1* 12/2019 Pieterse ................ B60D 1/665
2020/0039478 A1* 2/2020 Moreno ................. B60D 1/66
2020/0269641 A1 8/2020 Edwards

* cited by examiner

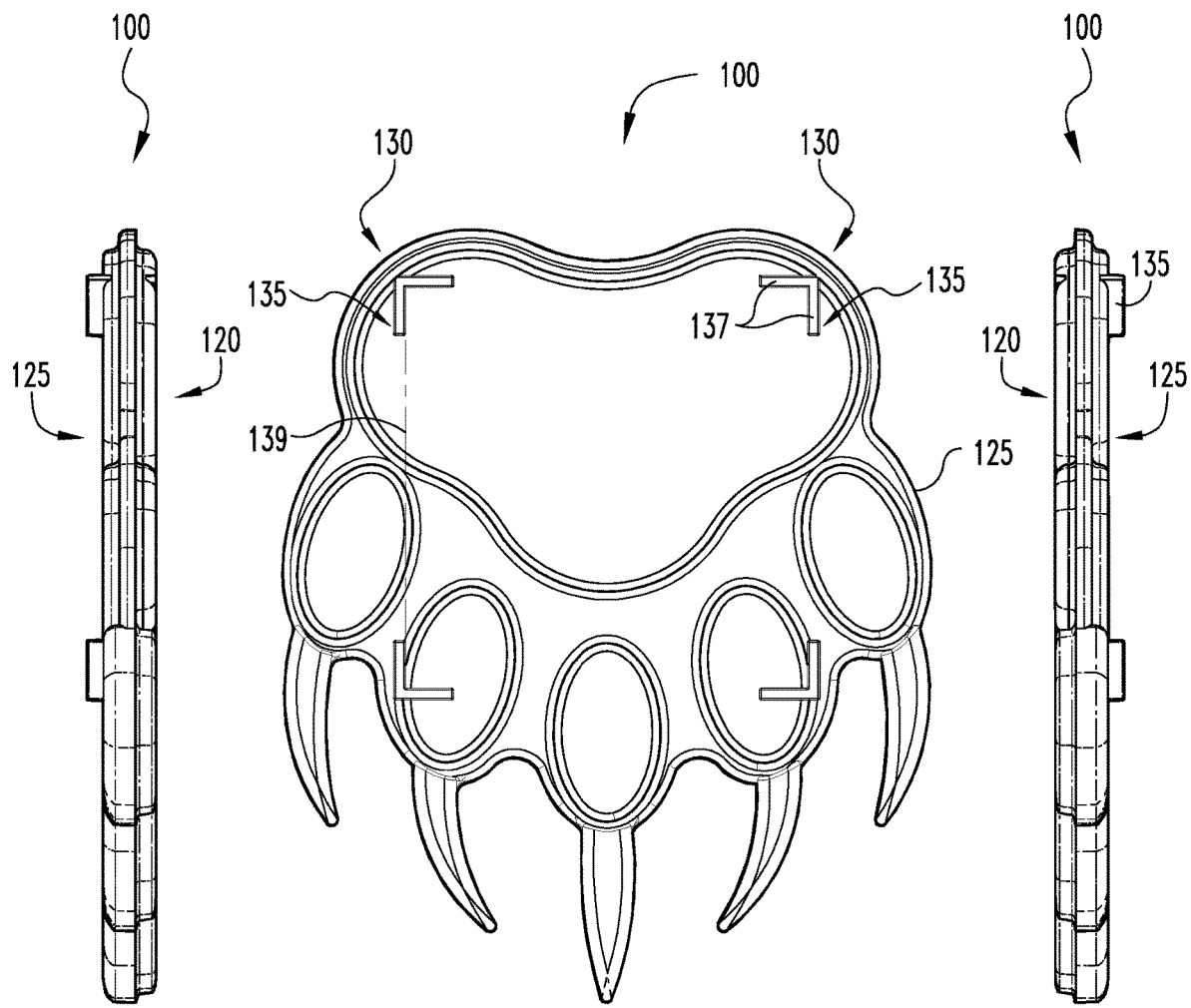
Fig. 6 Fig. 4 Fig. 5
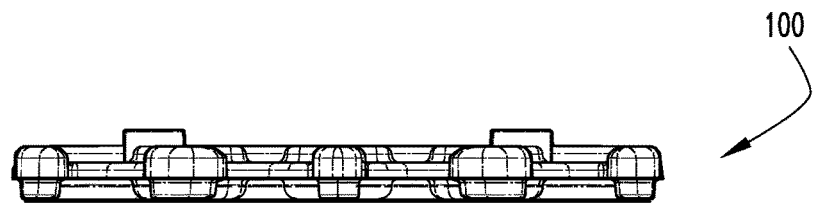
Fig. 3

METHOD AND APPARATUS FOR STABILIZING VEHICULAR JACK BASES

TECHNICAL FIELD

This specification relates generally to the field of mechanical engineering and, more specifically, to base pads for recreational vehicle stabilizing jacks that leave animal footprints after use.

BACKGROUND

Recreational vehicles (RVs) are typically motor homes or trailers that feature living quarters affording temporary or permanent accommodation to occupants. RVs encompass motorhomes, campervans, caravans (including travel trailers and camper trailers), fifth-wheel trailers, popup campers and truck campers. When an RV is parked for an extended period of time, such as at a camp site or RV park, stabilizing jacks are typically extended from the RV to help level the RV interior as well as prevent undesired movement or settling of the RV. Typically, jack pads are placed at the jack/ground interface to prevent the jacks from sinking into soft ground, which could make the jacks difficult to later retract as well as slowly deviating the RV interior from level.

Currently, jack pads are typically brightly colored (usually yellow) members made of honeycombed hard plastic. These jack pads are inherently unattractive eyesores when in use and leave equally unattractive checkered patterns in the ground after the RV has retracted its jacks and moved on. Thus, there is a need for more efficient systems for shipping and storing goods. The present novel technology addresses these needs.

BRIEF DESCRIPTION OF THE DRAWINGS

FIG. 3 depicts a front end view of the embodiment of FIG. 1.

FIG. 4 depicts a top view of the embodiment of FIG. 1.

FIG. 5 depicts a first side view of the embodiment of FIG. 1.

FIG. 6 depicts a second, reverse side view of the embodiment of FIG. 1.

Like reference numbers and designations in the various drawings indicate like elements.

DETAILED DESCRIPTION

Figure 1:
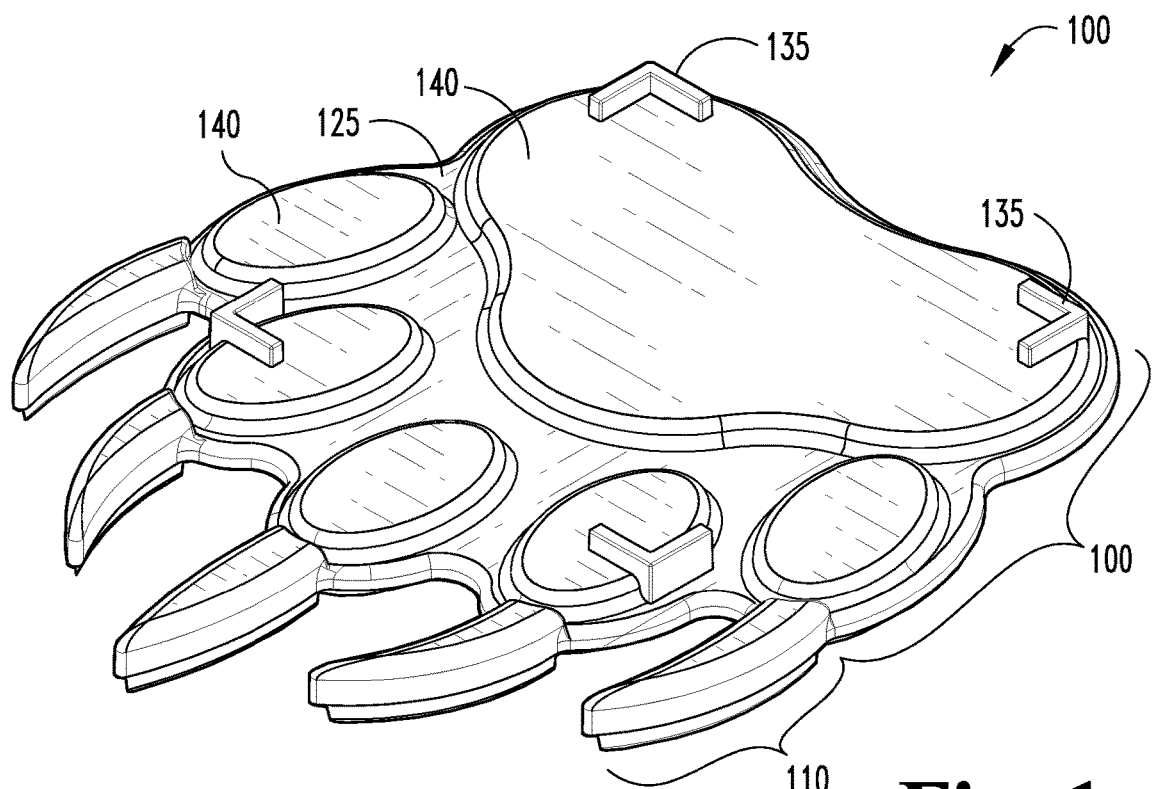
FIG. 1 depicts a top perspective view of a first embodiment of the present novel technology.

Before the present methods, implementations, and systems are disclosed and described, it is to be understood that this invention is not limited to specific synthetic methods, specific components, implementation, or to particular compositions, and as such may, of course, vary. It is also to be understood that the terminology used herein is for the purpose of describing particular implementations only and is not intended to be limiting.

As used in the specification and the claims, the singular forms "a," "an" and "the" include plural referents unless the context clearly dictates otherwise. Ranges may be expressed in ways including from "about" one particular value, and/or to "about" another particular value. When such a range is expressed, another implementation may include from the one particular value and/or to the other particular value. Similarly, when values are expressed as approximations, for example by use of the antecedent "about," it will be understood that the particular value forms another implementation. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not. Similarly, "typical" or "typically" means that the subsequently described event or circumstance often, though may not always, occur and that the description includes instances where said event or circumstance occurs and instances where it does not.

When a recreational vehicle (RV) is parked, whether for the day or for the season, it is desirable for the RV to be maintained as level as possible. In addition to preventing miscellaneous items from rolling around and or sliding, a level surface helps to keep appliances such as the absorption refrigerator working properly. Once the RV has been made level, it is advantageous to deploy stabilizing jacks to keep the RV level, so as to optimize the efficiency of the appliances, which helps to keep operating costs low as well as limiting undue system wear.

While it is preferred to find a resting spot that is already flat and even, such a lucky find is not always possible. When parked on uneven terrain, RV stabilizing jacks may be deployed to compensate for terrain inequity to both level the vehicle and also maintain the level position, steading the RV.

Stabilizing jacks work more effectively when the surface area of the distal end of the jack is increased via the attachment of a jack foot pads. In addition to preventing the jack from sinking into soft ground and thus losing level over time as well as making the retraction of the jack leg difficult, the foot pad increases the effective surface area of the jack such that ground contact is more even and the jacks are less prone to sliding.

Most foot pads or jack pads are made of a rigid, honeycombed plastic and have a geometric shape, usually square, circular, or hexagonal. The most popular color of these jack pads is bright yellow. While functional, such jack pads are eyesores and leave unnatural crosshatched prints in the ground when the RV moves on.

Figure 2:
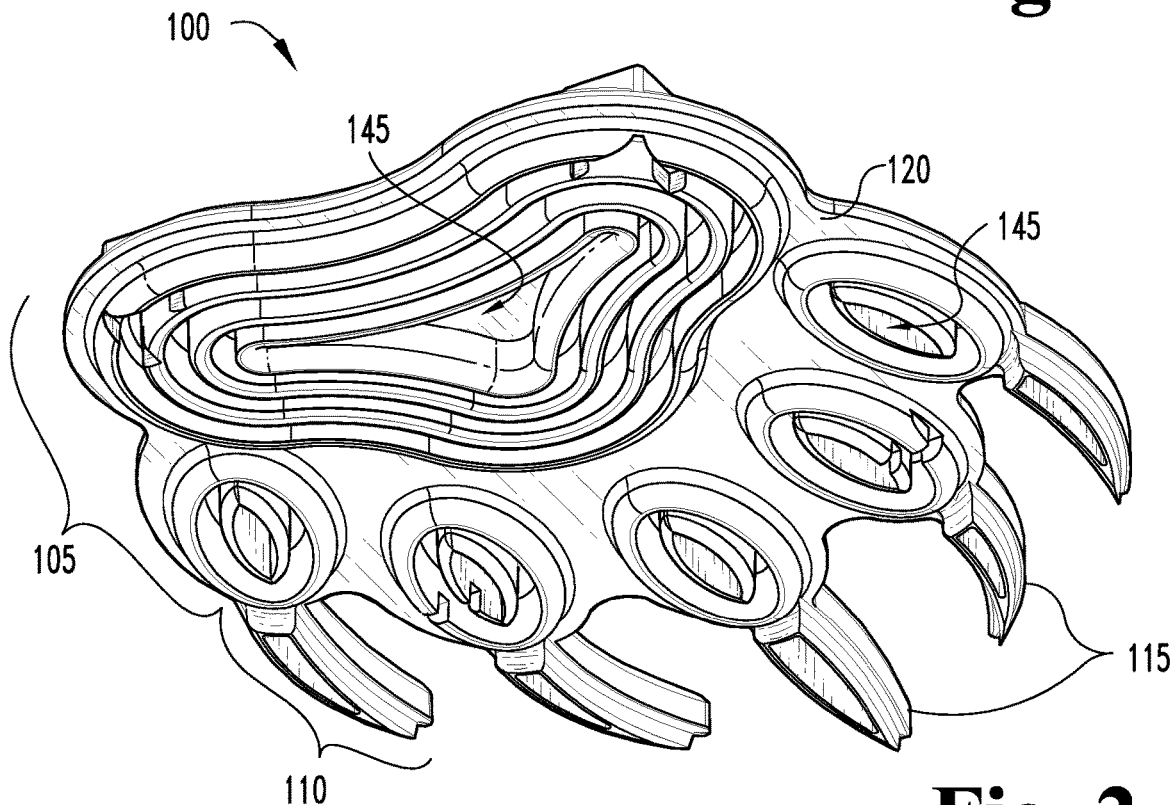
FIG. 2 depicts a bottom perspective view of the embodiment of FIG. 1.
Figure 7:
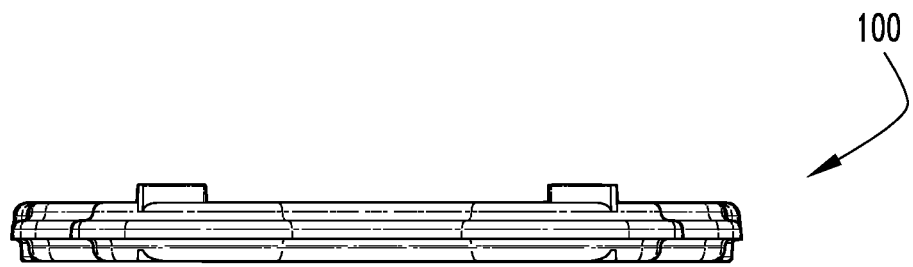
FIG. 7 depicts a rear end view of the embodiment of FIG. 1.
Figure 8:
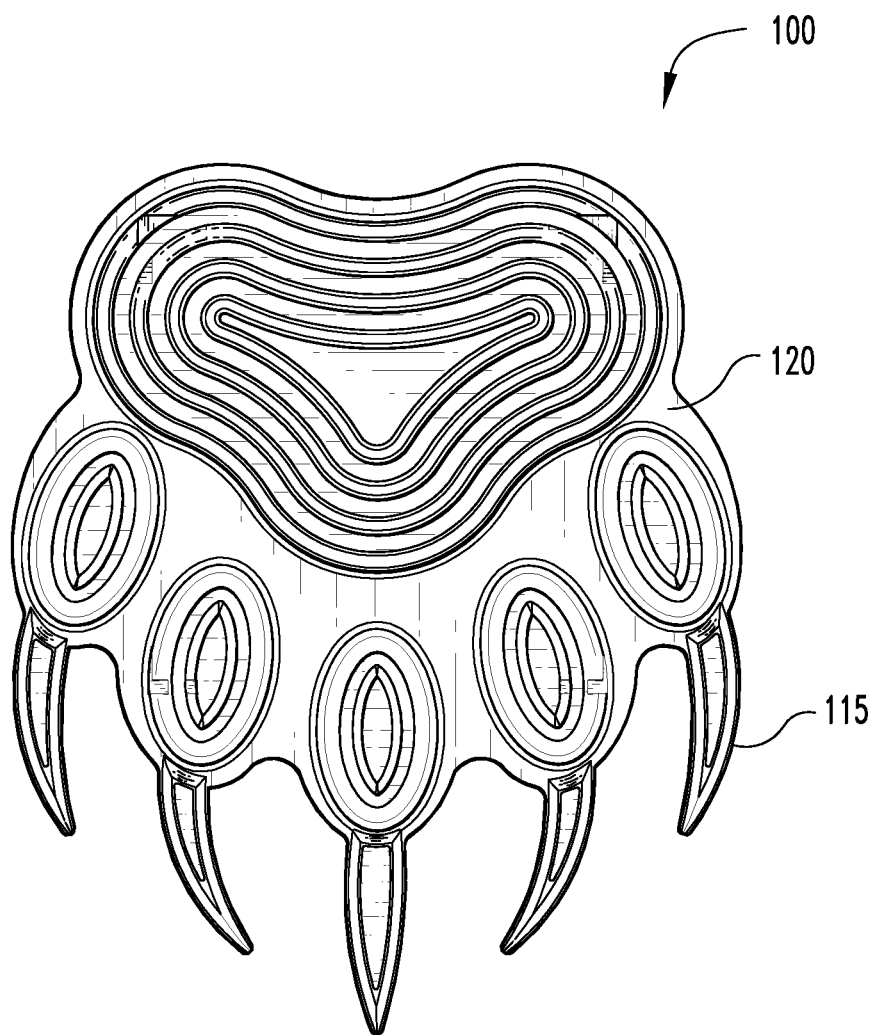
FIG. 8 depicts a bottom view of the embodiment of FIG. 1.
Figure 9:
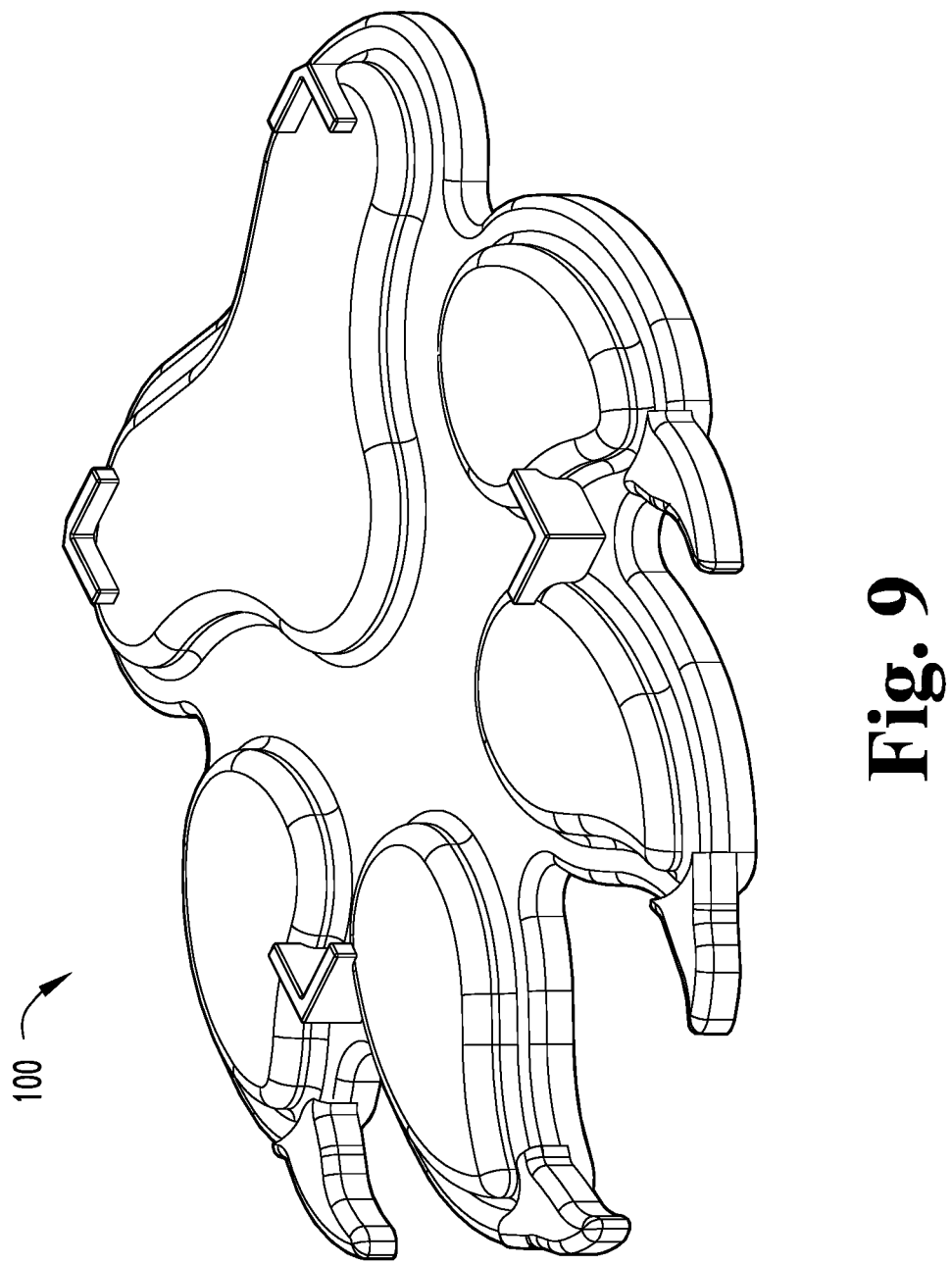
FIG. 9 depicts a perspective view of a second embodiment of the present novel technology.
Figure 10:
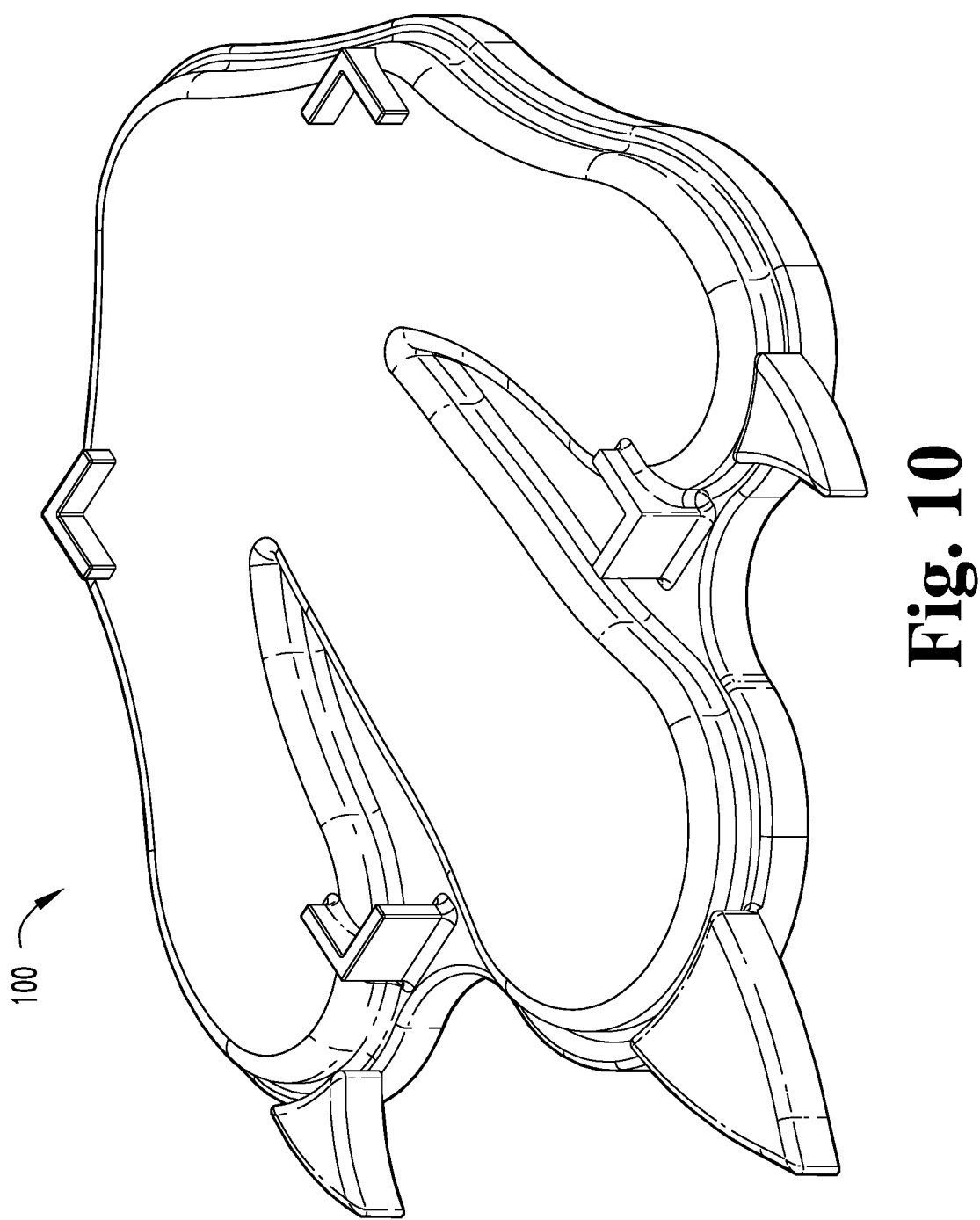
FIG. 10 depicts a perspective view of a third embodiment of the present novel technology.
Figure 11:
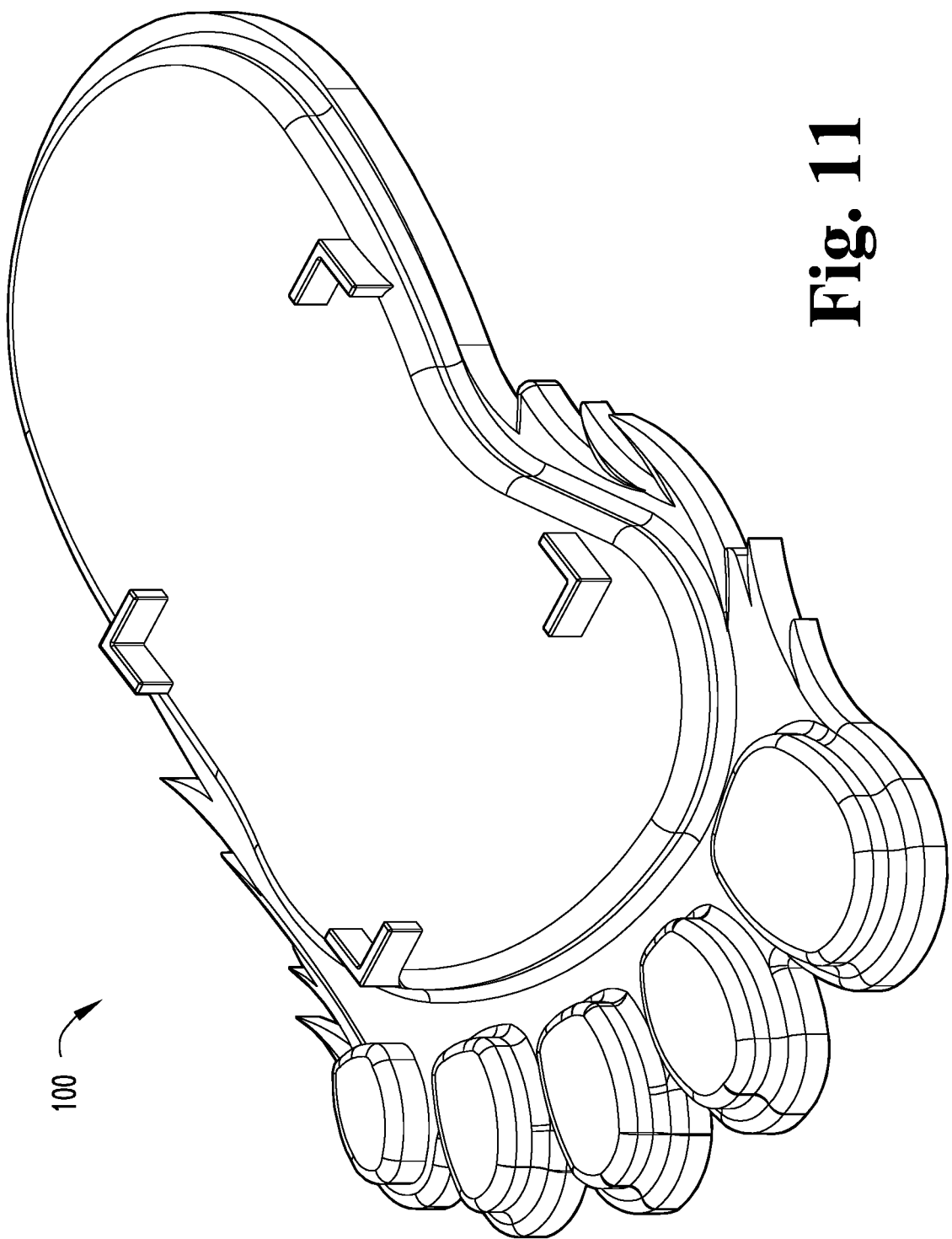
FIG. 11 depicts a perspective view of a fourth embodiment of the present novel technology.
Figure 12:
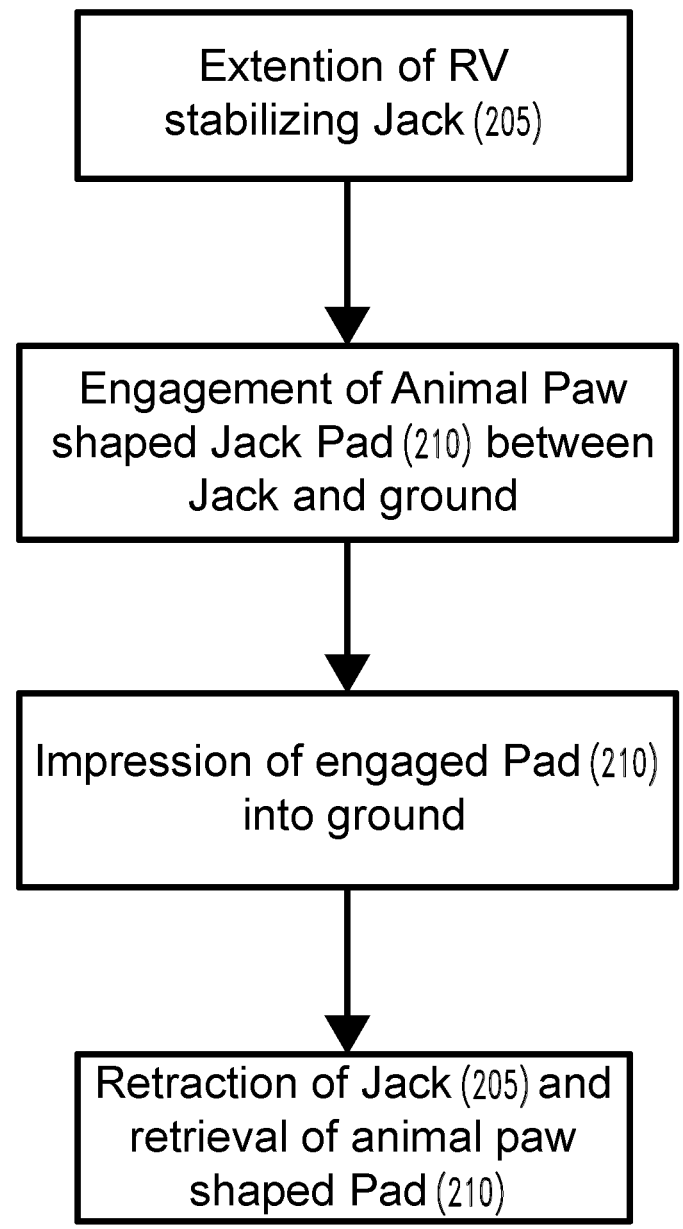
FIG. 12 is a flow chart depicting the method of making animal track souvenirs.

FIGS. 1-12 depict various perspectives and embodiments of a jack pad 100 having a palm portion 105 and a digit portion 110, the digit portion 110 including a plurality of elongated fingers 115 connected to and extending from the palm portion 105.

The palm portion 105 is a generally flat plate having a bottom side 120 and an oppositely disposed top side 125. The top side 125 includes a jack-engaging assembly 130 for engaging a standard circular profile jack head (typically about 10 to about 15 cm. in diameter), a standard square profile jack head (side length typically about 15 cm.), and/or a standard elongated rectangular profile jack head (about 15 cm. by about 23 cm.). Jack engaging assembly 130 includes four spaced ninety-degree angled raised corner members 135 about 0.5 to 1.5 cm. tall and positioned to define the corners of a square of side length of about 17 cm. o.d. (about 16 cm. i.d.). Each corner piece 135 includes two elongated side portions 137 that intersect at a ninety-degree angle, with each side portion 137 extending about 2.5 cm., leaving open sides 139 of length about 12 cm. between any two corner members 135. A square jack foot will snugly engage the corners, while a circular jack foot likewise may engage the ends of each elongated side portion 137, and a rectangular foot may be positioned to extend through two opposing open sides 139 to be engaged by the side members 137. Pads 100 are typically repeatedly removably connected to jacks, but may likewise be permanently affixed thereto as OEM or aftermarket fixtures.

The top side 125 may also include a plurality of raised (or concave) contour features 140 positioned at the base of each finger 115 and/or at the heal of the palm disposed opposite the digit portion 110.

Likewise, the bottom face 120 includes a plurality of contour features 145 for stamping a three-dimensional contoured footprint into soft soil under the weight of the vehicle as transmitted through the stabilizing jacks and over the time the vehicle is parked and stabilized. Typically, the bottom side 120 and top side 125 are contoured to be mirror images of one another, with indentions 151 in the bottom side 120 to snugly or lockingly receive raised corner pieces 135 or at least portions of the wall members 137, such that the pads 100 may nest together and stackingly engage one another for ease of storage. Typically, the foot pad 100 is shaped and contoured to both stabilize the weight distribution of the RV among the plurality of jacks as well as to leave an impression evocative of an animal (real, extinct, or imaginary) footprint or track, such as a bear (see FIGS. 1-8), a wolf (see FIG. 9), a dinosaur (see FIG. 10), a sasquatch (see FIG. 11), a very large bird, or the like.

In some implementations, jack pads 100 are used as part of a method 200 for using an RV to make animal-like tracks. In one implementation, faux animal tracks are made by first extending 205 at least one stabilizing jack from an RV toward soft ground and engaging 210 at least one animal paw shaped jack pad between the at least one jack and the ground. Next, pressing 210 the at least one jack pad into the ground yields at least one animal track print pressed into the ground. Typically, the at least one jack is retracted 215 and the at least one jack pad is retrieved 220 to reveal 225 at least one imprinted animal-like track.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some instances be excised from the combination, and the claimed combination may be directed to a subcombination or variation of a subcombination.

Thus, particular embodiments of the subject matter have been described. Nigh-infinite other embodiments are within the scope of the following claims. In some instances, the actions recited in the claims may be performed in a different order and still achieve desirable results. In addition, the processes depicted in the accompanying figures do not necessarily require the particular order shown, or sequential order, to achieve desirable results.

What is claimed is:

1. A reusable vehicular jack pad system, comprising:
a plurality of jack pads, each respective pad further comprising:
a top face;
an oppositely disposed bottom face;
a jack-engaging assembly operationally connected to the top face;
a palm portion; and
a toe portion extending from the palm portion;
wherein each respective jack pad is shaped like an animal paw;
wherein each respective bottom face is contoured to leave a paw print in soft ground;
wherein each respective top face is contoured to stackingly engage a respective bottom face; and
wherein the jack-engaging assembly further comprises four raised corner members disposed on the top face and on the palm portion and spaced to define a square;
wherein each side of the square is about 17 cm. long;
wherein each side of the square includes a distance of about 12 cm. between two respective corner members.

* * * * *